Nov. 16, 1965 KAZUO HASHIMOTO 3,218,391

AUTOMATIC REPORTING APPARATUS

Filed Oct. 26, 1961 3 Sheets-Sheet 1

Nov. 16, 1965 KAZUO HASHIMOTO 3,218,391
AUTOMATIC REPORTING APPARATUS
Filed Oct. 26, 1961 3 Sheets-Sheet 2
Fig. 3. A
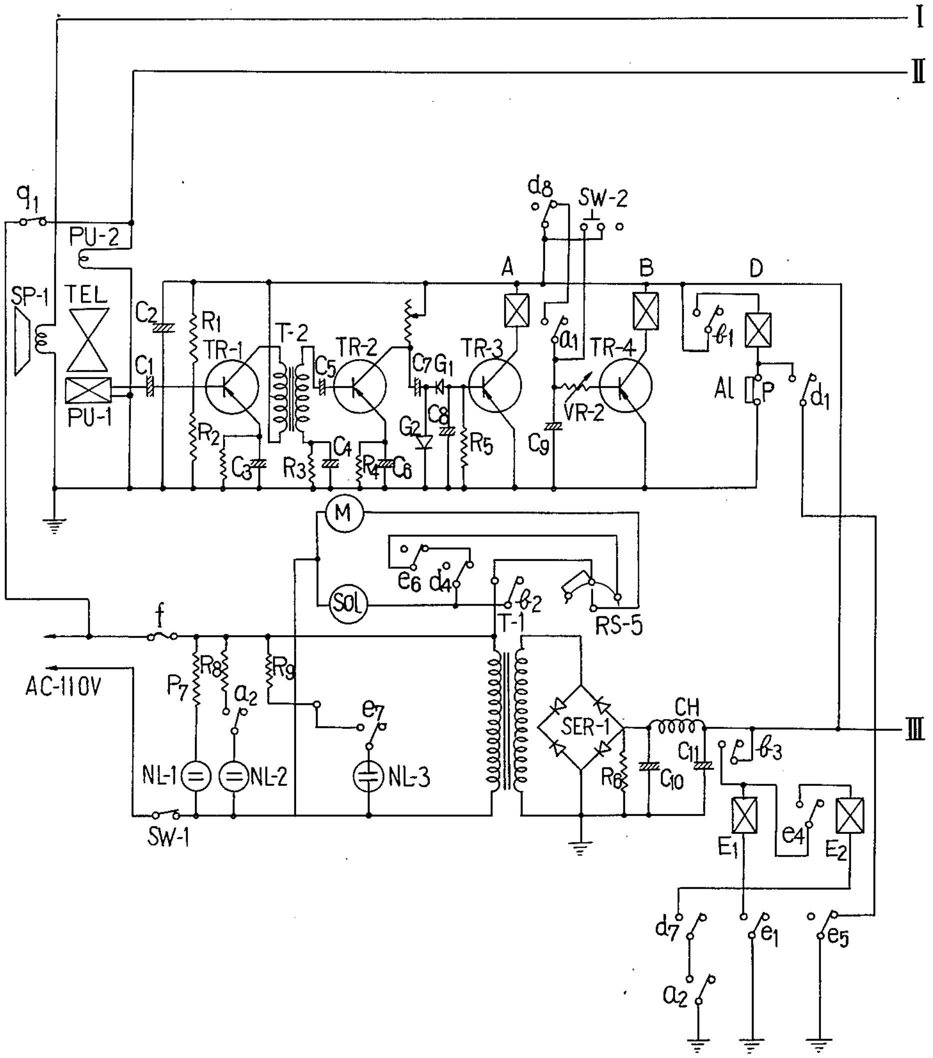

Nov. 16, 1965 KAZUO HASHIMOTO 3,218,391

AUTOMATIC REPORTING APPARATUS

Filed Oct. 26, 1961 3 Sheets-Sheet 3

United States Patent Office 3,218,391

Patented Nov. 16, 1965

3,218,391
AUTOMATIC REPORTING APPARATUS
Kazuo Hashimoto, 1050 3-chome, Kamiuma-cho, Setagaya-ku, Tokyo-to, Japan
Filed Oct. 26, 1961, Ser. No. 147,829
Claims priority, application Japan, Nov. 7, 1960, 35/44,673
4 Claims. (Cl. 179—2)

This invention relates to special automatic reporting apparatus.

An essential object of this invention is to provide electrical systems which automatically send information, for example, a system including an apparatus which operates through a telephone system to report automatically the television channel to which a television receiver is tuned, the information thus obtained being used for such a purpose as surveys of program popularity.

In such a case, the investigator listens, through a telephone system, for an audible tone which has a characteristic frequency for each channel. Various methods are possible for causing the audible tone characteristic for each channel to be generated. For example, an apparatus for this purpose may be connected mechanically and directly to the channel-switching mechanism of the television receiver, or means may be provided to intercept the electromagnetic waves of intermediate frequency which are generated from the television receiver and to convert these waves into audible tones. However, irrespective of whatever method is adopted, the purport of the present invention remains the same.

The details of the invention will be best understood by reference to the following description of a representative embodiment of the invention, wherein an apparatus is coupled mechanically to the channel-switching mechanism of a television receiver so as to cause the generation of audible tones, when taken in conjunction with the accompanying illustrations in which the same and equivalent parts are designated by the same reference numerals or letters, and in which:

FIGS. 3A and 3B are electrical circuit diagrams showing the automatic receiving and reporting apparatus part of the embodiment of FIG. 1 wherein $C_1$ to $C_{20}$ are condensers and $R_1$ to $R_{20}$ are resistances, respectively.

Figure 1:
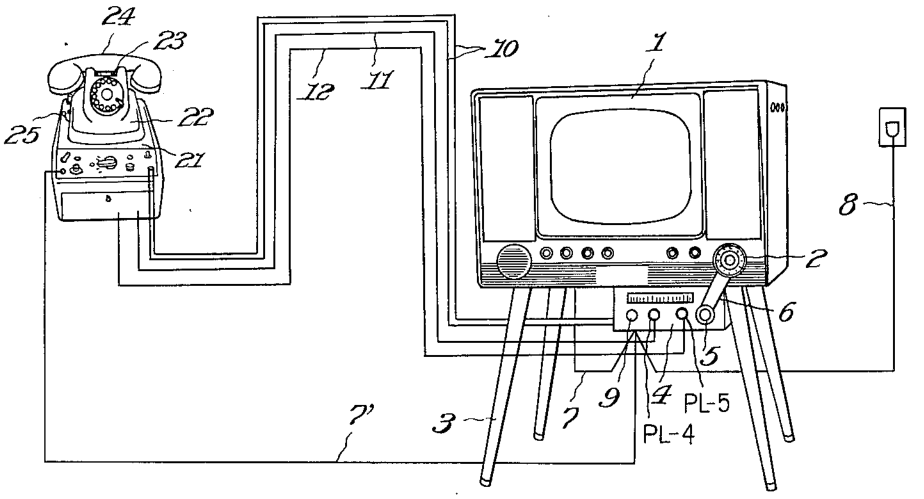
FIG. 1 is a perspective view, partly in diagrammatic form, showing the general arrangement of the embodiment of the invention.
Figure 2:
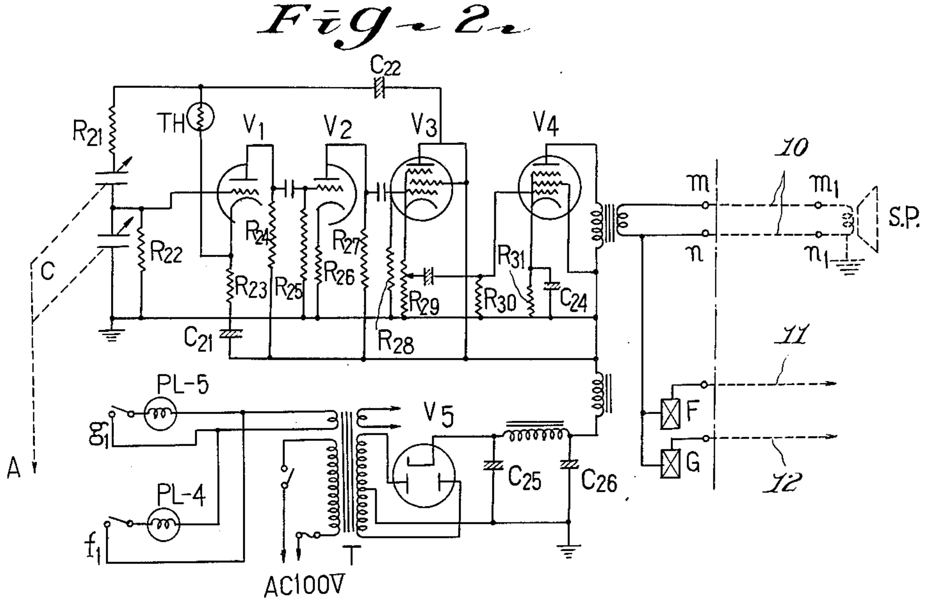
FIG. 2 is an electrical circuit diagram showing the signal-sending part of the apparatus of the embodiment of FIG. 1.

Referring to FIG. 1, the television receiver 1 shown has a channel-changing switch 2, which, in this embodiment, is a rotary switch which is capable of switching to all channels by one revolution thereof. The receiver 1 is of the type mounted on legs 3. A low-frequency, signal oscillator 4, which is installed below the receiver 1, has a dial 5 and is so adapted that, by rotating the said dial 5 through one revolution, it is capable of generating, for example, twelve kinds of low frequency signals the cycles of which are successively different, for example, by 100 cycles per second between, for example, 100 cycles per second and 1,200 cycles per second. The internal electrical construction of this oscillator 4 is as indicated in FIG. 2, wherein condensers $C_{21}$ to $C_{26}$, resistances $R_{21}$ to $R_{31}$, vacuum tubes $V_1$ to $V_5$, and a transformer T are provided.

A belt 6 mechanically couples the aforesaid channel-changing switch 2 and the aforesaid dial 5 in such a manner that their angles of rotation are synchronized. The power supply cord 7 of the television receiver is inserted into a plug-in receptacle of the low-frequency oscillator, and a power-supply cord 8 of the said oscillator is led to an alternating-current, 100-volt (110-volt in U.S.A.) power source. A power switch 9 simultaneously switches on the power supply to the low-frequency oscillator, a telephone receiving and reporting apparatus to be described hereinafter, and the television receiver. Reference numeral 10 designates the lead wires for the voice coil of a loudspeaker circuit which is activated by the output of the said low-frequency oscillator, and these lead wires are led to a loud-speaker within the automatic receiving and reporting apparatus to be described hereinafter. Conductors 11 and 12 are connected to pilot lamps PL–4 and PL–5 which indicate the operational condition of the automatic reporting apparatus to be described hereinafter, and which are to be observed by the person being investigated, that is, the television viewer.

The afore-mentioned automatic receiving and reporting apparatus is housed within a cabinet 21 and supports on its upper platform a desk telephone set 22 as shown in FIG. 1. When the bell of this desk telephone set rings, an arm 23 which is disposed at the rear of and is actuated by the apparatus lifts the telephone receiver 24, thereby placing the telephone set in its communicative state, and a previously recorded message of reception is transmitted to the calling party from a built-in loudspeaker 25. If, at this time, the television receiver is being operated, it will be possible to report to the calling party the identity of the channel being received by transmitting through the telephone microphone, from the loudspeaker 25, the low-frequency tone which is characteristic of the said channel, and which is determined by the position of the oscillator dial 5 coupled to the channel switch of the television receiver. Accordingly, the calling party can immediately identify the channel to which the viewer's television receiver is tuned at the time.

With the above-described system, however, when the calling party makes a call through the television viewer's telephone, the calling party first hears the message of reception, then immediately the aforesaid characteristic channel tone is transmitted. Accordingly, secrecy with respect to a third party cannot be kept, and, moreover, the system is extremely inconvenient for operation with an ordinary telephone.

Therefore, a system such as the following becomes necessary. That is, the message of reception to be previously recorded in the built-in recorder should be selected to be appropriate for use in general telephone conversation, for example, "Hello! This is Hashimoto. Please hold the line." Then, only after the investigator has made his call and heard this reception message and has confirmed that the called party is truly the party to be investigated, a special signal tone is transmitted by the investigator for the first time to activate a special circuit in the instant apparatus which is activated only by this signal tone, thereby sending to the investigator by means of the loudspeaker 25 a low-frequency signal corresponding to the television channel being viewed. The reason for this necessity is that, since it is the normal procedure to install such an apparatus in the television viewer's domicile at the expense of the investigator, persons other than the investigator should be prevented from using this apparatus.

Figure 3B:
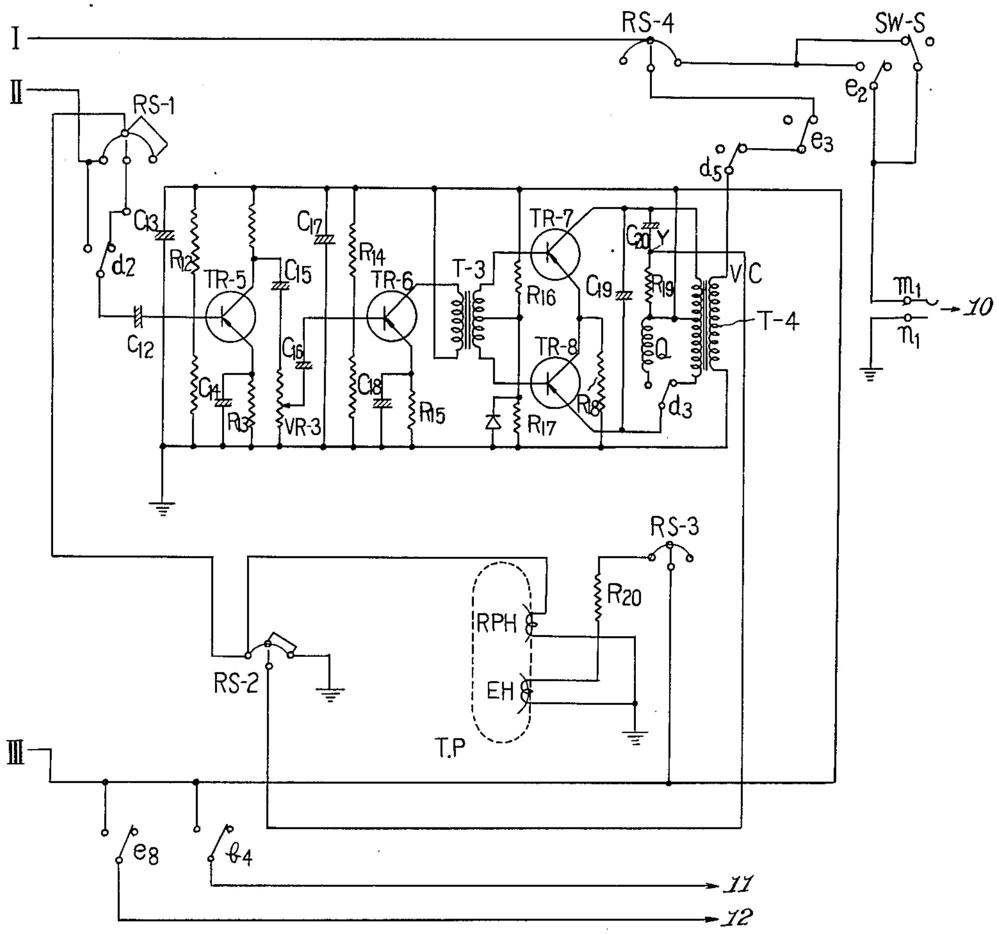

FIG. 3 indicates the details the electrical construction of the reporting apparatus according to the present invention. By merely placing an ordinary desk-type telephone set on the platform of this apparatus, this apparatus is rendered capable of performing the afore-described operations without any wiring connection whatsoever with the telephone system. A detailed description of this apparatus is given below.

Beginning with the input part of the apparatus, a pick-up coil PU–1 is installed in a position at which the leakage flux of the call-bell of a desk telephone set TEL is most easily picked up when the said telephone set is placed on the cabinet of the present apparatus. Similarly, a pickup coil PU–2 is installed in a position at which the voice flux of the interior of the telephone set is most easily picked up. Accordingly, these inductive couplings are achieved by merely placing the telephone set on the platform of the present apparatus.

An input signal entering through the pickup coil PU–1 is amplified by transistors TR–1 and TR–2, is rectified by diodes $G_1$ and $G_2$, and operates a relay A through a transistor TR–3. When the relay A operates, its contacts $a_1$ and $a_2$ make contact, and the closure of the contact $a_1$ causes a timer circuit consisting of a transistor TR–4, a variable resistor VR–2, and a capacitor $C_9$ to be activated to operate a relay B. After the elapse of approximately 30 seconds, the relay B is restored to its original state by the discharging of the capacitor $C_9$, but during this time, contacts $b_1$, $b_2$, and $b_3$ are closed. The closure of the contact $b_1$ causes preparation for flow of current to a relay D to be made, and the closure of $b_2$ causes a solenoid coil Sol and a motor M to operate. As a result, the receiver of the telephone is lifted by the arm 23 shown in FIG. 1 and is placed in its operative condition, and a sound-recording tape TP is driven by the motor M and transmits the previously recorded message of reception to the calling party through a loudspeaker SP–1, that is, the loudspeaker 25 shown in FIG. 1.

On one hand, a contact $b_4$ causes, through a conductor 11 shown in FIG. 2, a relay F to operate, whereby a contact $f_1$ is closed to turn on a pilot lamp PL–4. Accordingly, even if the telephone and television receiver are separated by distance, the television viewer is informed of the fact that a telephone call has come through.

Furthermore, a piece of aluminum foil, as indicated by AL at the relay D in FIG. 3, is attached to the splice of the endless tape TP. When this aluminum foil piece comes into a position at which it shorts two contact poles P which are in the relay D circuit, the relay D operates and is immediately self-held by its own contact $d_1$, maintaining its self-held state even after the piece AL has passed off the contact poles. The operation of the relay D causes each of the contacts $d_2$, $d_3$, $d_4$, $d_5$, $d_6$, and $d_7$ to be switched over to the left as viewed in FIG. 3. The switching of the contact $d_4$ stops the motor M. This is the position corresponding to the final end of the tape TP; that is, it means that the tape will be driven from its starting point when it next operates, the reason being that the tape TP is an endless tape as shown in FIG. 3.

Transistors TR–5, TR–6, TR–7, and TR–8 form a recording and reproducing circuit and are controlled by rotary switches RS–1 through RS–5. More specifically, at the leftmost position, as viewed in FIG. 3, of the rotary switches, the circuit is in the recording state, and an input entering through the pickup coil PU–2 passes through the contact $d_2$ from the switch RS–1 and, through a capacitor $C_{21}$, becomes the input of the transistor TR–5. Moreover, the output for recording bias which emerges from a point Y of the final stage passes through the switch RS–2 to be impressed on a receiving head RPH, where it is recorded on the tape TP. The afore-mentioned input entering through the pickup coil PU–2 corresponds in this case to the voice message which is spoken toward the lifted telephone receiver, and which is picked up by the pickup coil PU–2. For example, if a message such as "Hello, this is Hashimoto, please hold the line," is spoken toward the telephone receiver, this is recorded on the tape. In order to reproduce this recording to confirm it, the rotary switches are turned to the center position. At this time, since the erasing head EH is switched off by the switch RS–3, it is not operative, and the input entering from the receiving head RPH passes through the switch RS–1 and contact $d_2$, is amplified by the transistors TR–5, TR–6, TR–7, and TR–8, passes through contacts $d_5$ and $e_3$ and the switch RS–4 from the secondary side of an output transformer T–4, and is reproduced by the loudspeaker SP–1.

After it has been confirmed that the message of reception has been satisfactorily recorded on the tape TP in this manner, the rotary switches are turned to their rightmost positions. Then, when the call-bell rings, and the relay B operates to cause the solenoid coil Sol to lift the arm of the telephone and the motor M to rotate, the input entering the transistor TR–5 from the receiving head RPH through the rotary switches RS–2 and RS–1, and the contact $d_2$ passes from the secondary side of the output transformer T–4, as described above, through contacts $d_5$ and $e_3$ and the switch RS–4 and transmits the message of reception to the calling party. When the tape TP reaches a position at which the aluminum foil piece AL shorts the contact poles P, the relay D operates, and the input circuit from the receiving head RPH is opened by the contact $d_2$, whereby the switch RS–1 is cut off from the said circuit. The input from the pickup coil PU–2 then passes through the contact $d_2$ and becomes the input of the transistor TR–5. Simultaneously, the contact $d_5$ disconnects the output of the output transformer T–4 from the loudspeaker SP–1, and a lead selector coil Q is connected in parallel with the output transformer by the contact $d_3$. Furthermore, the motor M is stopped by the contact $d_4$. In addition, a contact $d_8$ opens, whereby, even when the relay A subsequently operates and the contact $a_1$ closes, the transistor TR–4 is prevented from operating.

When the present apparatus in the above condition is to be used for the purpose of a survey, a special audible signal is introduced from the outside telephone. This signal is picked up by the pickup coil PU–2, is amplified, and excites the lead selector coil Q inserted in the output circuit of the transistors TR–7 and TR–8. Accordingly, the lead selector installed in the said coil operates to close its contact $q_1$, whereby one line of the 110-volt alternating current power supply is connected as the input of the pickup coil PU–2 to actuate the relay A. As a result, contacts $a_1$ and $a_2$ operate, $a_1$ being independent of the time circuit as mentioned hereinbefore, but $a_2$ causes a relay $E_1$ to operate.

That is, by introducing a special audible sound, this, only, becomes a key to cause the relay $E_1$ to operate. This special sound signal of audible frequency is generated by such means as a whistle. The telephone provided with the present apparatus is first called, and the message of reception of the called party is listened to in order to ascertain the identity of the called party. Then the said means is operated to generate the special sound.

When the relay $E_1$ operates, it is self-held by a contact $e_1$, and, through a contact $e_4$, it causes a relay $E_2$ to operate and be self-held. At the same time, a contact $e_5$ causes the relay D to cease its operation, whereby the contacts $d_1$ through $d_6$ are changed over to their right-hand positions as viewed in FIG. 3, and a contact $e_2$ causes the input of the low-frequency oscillator which enters through contacts $m_1$ and $n_1$, that is, the conductors 10, to be in the state of being emitted audibly through the loudspeaker SP–1. The contact $e_3$ opens the circuit of the transformer T–4 and the loudspeaker SP–1. Another contact $e_6$ maintains the motor M in its stopped condition, even when the contact $d_4$ is returned to the right, whereby the recorder is maintained inoperative, and a contact $e_7$ causes a neon lamp NL–3 to indicate the fact that the relay $E_1$ has operated. Furthermore, a contact $e_8$ causes current to flow through a conductor 12 to a relay G shown in FIG. 2, whereby a contact $g_1$ is closed, and a pilot lamp PL–5 is turned on to indicate to the television viewer, that is, the party being investigated, that the call being made at present is for the purpose of a survey.

When the relay $E_1$ operates in the above-described manner, the output of the low-frequency oscillator entering terminals $m_1$ and $n_1$ is transmitted from the conductors 10, through the loudspeaker SP–1, to the investigator. Since the frequency of this low-frequency wave is adapted to be that corresponding to the television channel to which the television receiver is presently tuned, the investigator hearing this signal from the loudspeaker SP–1 through the telephone is able to identify immediately the said channel. If, at this time, the television receiver is not being used, this apparatus does not operate because of opening of the power source switch.

After the elapse of approximately 30 seconds from the beginning of the operation, the capacitor $C_9$ discharges, and the relay B is returned to its original state, whereby the solenoid coil Sol is returned by the contact $b_2$, the relay $E_1$ is also returned by the contact $b_3$, and all parts are thus returned to their original states.

Although the above description has concerned that case wherein a party having the purpose, principally, of making an investigation makes a call and causes the present apparatus to operate, the present system, since it utilizes an ordinary telephone, would be inconvenient if it were to interfere with ordinary telephone communication. Accordingly, when the telephone call-bell rings, the party being investigated first ascertains this fact by means of the pilot lamp PL–4, then it is necessary that he observe whether or not the pilot lamp PL–5 is turned on. If the pilot lamp PL–5 is not turned on, it may be assumed that the calling party is an ordinary caller, and the call may be answered in the ordinary manner by holding the telephone receiver within 30 seconds. If the pilot lamp PL–5 is lit, it indicates that the call is for the purpose of investigation, and the telephone may be left unanswered.

Hitherto, apparatus used for such purposes as surveys of television program popularity have sound-recorded or otherwise recorded such information as the identity of the channels to which the receivers have been tuned, and the recordings have been collected after a certain period of time to be compiled and analyzed. By the use of the apparatus of this invention, however, the same information can be obtained immediately with the use of an ordinary telephone system without any direct connection between the said apparatus and the telephone circuitry.

Since investigation of one television receiver by means of the present apparatus requires less than 20 seconds, a survey of by means of 300 units of the present apparatus, suitably distributed throughout a community for correct sampling, and 50 telephone sets would require a mere two minutes for one complete survey. The information thus obtained can be fed to an electronic computer for various analyses, after which such information as relative popularity of the various programs can be reported to their respective sponsors, the entire survey, analysis, and report requiring but a few minutes. Such rapid, effective results could not be obtained heretofore by the conventional investigation methods.

While the above disclosure has described an embodiment of the invention relating particularly to use in connection with television receivers, the invention is not intended to be limited to such use, being adaptable to other applications such as that for radio receivers. Moreover, since it is obvious that many changes and modifications can be made in the above-described details without departing from the nature and spirit of the invention, it is to be understood that the present invention is not to be limited to the details described herein except as set forth in the appended claims.

What is claimed is:

1. In a system for indicating at a remote station the tuned condition of a carrier-wave signal received in a home and having selecting means capable of selecting any one of a plurality of transmitted carrier frequencies to be received comprising, means operated by the selecting means for producing an audio frequency electrical signal of a different predetermined frequency for each of the carrier frequencies, a normally inoperative device for audibly reproducing each of the audio frequencies, a telephone subscriber system interconnecting a telephone at the remote station and a telephone at the home, means including a part reactively coupled with the telephone at the home and operated in response to a calling signal from the remote station for conditioning the home telephone to acoustically transmit audible signals to the remote station and means including said reactively coupled means responsive to a further signal from the remote station over the subscriber system for rendering the device operative to audibly reproduce the predetermined one of the audio frequencies for transmission over the telephone to the remote station.

2. In a system as defined by claim 1 including a phonograph at the home having a recorded message thereon identifying the subscriber, and means operated by the conditioning means for the telephone for rendering the phonograph operative to reproduce the message and transmit it through the telephone to the remote station.

3. In a system as defined by claim 1 in which the means operated in response to the calling signal from the remote station includes the bell of the telephone and means responsive to ringing of the bell for raising the earpiece of the telephone from its cradle.

4. A system as defined in claim 2, in which means are provided in response to a further signal from the remote station and to termination of the transmission of the recording message to transmit the audible signal to the calling station.

References Cited by the Examiner

UNITED STATES PATENTS

| | | | |
|---|---|---|---|
| 1,991,163 | 2/1935 | Lewis | 179—6 |
| 2,483,214 | 9/1949 | Lomax | 179—2 |
| 2,788,392 | 4/1957 | Krahulec | 179—2 |

DAVID G. REDINBAUGH, *Primary Examiner.*